March 14, 1967
R. H. BEGEMAN ETAL
3,309,511
HYPERBOLIC FUNCTION GENERATOR
Filed March 18, 1963
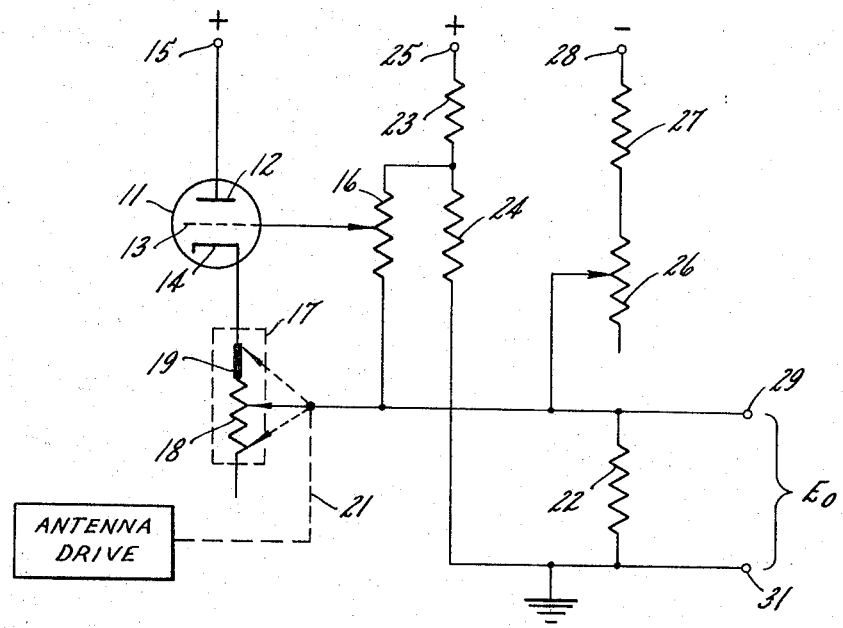
_Fig.1._
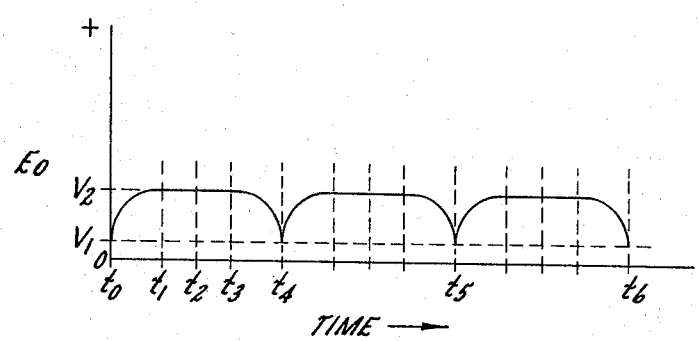
_Fig.2._
INVENTORS.
ROBERT H. BEGEMAN
EUGENE R. ROESCHLEIN
BY
*H. H. Losche*
ATT'YS.

United States Patent Office 3,309,511
Patented Mar. 14, 1967

3,309,511
HYPERBOLIC FUNCTION GENERATOR
Robert H. Begeman and Eugene R. Roeschlein, Indianapolis, Ind., assignors to the United States of America as represented by the Secretary of the Navy
Filed Mar. 18, 1963, Ser. No. 266,110
6 Claims. (Cl. 235—197)

The invention described herein may be manufactured and used by or for the Government of the United States of America for governmental purposes without the payment of any royalties thereon or therefor.

The present invention is generally related to electronic waveform function generating equipment and more particularly to circuitry for generating a hyperbolic cosecant voltage waveform having utility in various electronic systems including radar.

Those engaged in the design and development of modern radar systems and related electronics equipment often encounter a need for reliable signal generating or waveshaping circuitry capable of producing hyperbolic or cosecant voltage waveforms for various applications, such as utilization in conjunction with succeeding phantastron and multivibrator circuits to produce marker lines on the face of a radar display scope.

Although specially constructed potentiometers are available for producing cosecant output voltage waveforms when supplied with a constant potential input voltage and mechanically varied throughout their various resistance ranges, it has been found that these specially constructed potentiometers lack the ruggedness and reliability required for many commercial and military applications. Most such cosecant potentiometers utilize resistance wire of various sizes, each size being wound on a trapezoidally shaped card whose dimensions are determined by the values of the function to be produced. These cards of various sizes of wire are coupled in series and a mechanical slider or variable contact is provided to form the cosecant potentiometer. In the case of a radar system in which this variable contact must be rotated or reciprocated by a mechanical linkage to the radar antenna, it has been found that circuit continuity is often broken as the slider passes from one card to another or from one size of wire to another. This continuity break disrupts the functioning of successive phantastron and multivibrator circuitry which utilize the cosecant waveform. This situation prompted the present invention which utilizes a much more reliable linear potentiometer in conjunction with vacuum tube circuitry to provide the required cosecant waveform. Such linear potentiometers are commercially available having a much greater variety of electrical and mechanical properties and at a lower cost than special cosecant potentiometers.

An object of the present invention is the provision of a circuit for producing an output voltage waveform having a cosecant function.

Another object is to provide a rugged and reliable cosecant function voltage waveform generating circuit.

A further object of the invention is the provision of a cosecant function voltage waveform generating circuit utilizing a linear potentiometer.

Still another object is to provide a cosecant waveform generating circuit capable of maintaining continuity of the waveform generated without undesirable interruptions therein.

Other objects and features of the invention will become apparent to those skilled in the art as the disclosure is revealed in the following detailed description of a preferred embodiment of the invention as illustrated in the accompanying sheet of drawing in which:

FIGURE 1 discloses a schematic embodiment of a preferred form of the waveform generating circuit of this invention; and FIGURE 2 illustrates the general shape of the output voltage waveform produced by the circuitry of FIGURE 1.

Referring now to the drawing there is shown in FIGURE 1 a triode vacuum tube 11 having an anode 12, a grid 13, and a cathode 14, the anode 12 being coupled to a source of positive direct current (D.C.) potential 15, the grid 13 being coupled to a potentiometer 16, and the cathode 14 being coupled to a linear potentiometer 17 which has a linear resistance portion 18 and a very nearly zero resistance portion 19. The movable or variable contact of potentiometer 17 is mechanically coupled via linkage 21 to the radar antenna whose motion causes the variable contact to reciprocate from one extremity of potentiometer 17 to the other. Potentiometer 17 has its variable contact coupled to one terminal of resistance 22 and to one terminal of feedback potentiometer 16, while the other terminal of potentiometer 16 is coupled to the junction of resistances 23 and 24, and the other terminal of resistance 22 is coupled to ground potential. The other terminal of resistance 23 is coupled to a source of positive D.C. potential 25 while the other terminal of resistance 24 is coupled to ground potential. Potentiometer 26 has its variable contact coupled to the nongrounded terminal of resistance 22, and its fixed terminal coupled via resistance 27 to a source of negative D.C. potential 28. Output terminals 29 and 31 are coupled across resistance 22.

FIGURE 2 shows the relative waveshape of the output voltage $E_o$ with respect to time, in which $V_1$ represents the minimum and $V_2$, the maximum, voltage values of that output voltage waveform.

Operation

The operation of the invention occurs in the following manner. At time $t_0$ in FIGURE 2, the radar antenna (not considered to be a part of this invention), which is coupled via mechanical linkage 21 to the movable contact of linear potentiometer 17, has that movable contact positioned such that all of the resistance of potentiometer 17 is placed in the cathode-to-ground circuit of triode 11 (i.e. the movable contact is placed in its lowermost position in FIGURE 1) causing the output voltage $E_o$ to be at its minimum value (shown as $V_1$ in FIGURE 2). The motion of the radar antenna coupled to potentiometer 17 via linkage 21 causes its movable contact to move upward from its lowermost point of greatest resistance at time $t_0$ along linear resistance portion 18 decreasing the total resistance in the cathode-to-ground circuit, thereby increasing the current flow and increasing $E_o$, i.e. the voltage drop across resistance 22. This change in cathode resistance with respect to time produces the hyperbolic or cosecant portion of waveform $E_o$ shown in FIGURE 2 from time $t_0$ to $t_1$. At time $t_1$ the movable contact has reached the end of linear section 18 of potentiometer 17 and continues to move across section 19 which has relatively zero resistance and whose length may be any desired percentage of the total length of potentiometer 17, thus producing the constant valued linear portion of $E_o$ shown in FIGURE 2 from time $t_1$ to $t_2$. At time $t_2$ the movable contact has reached it uppermost extremity in FIGURE 1, and the motion of the radar antenna via linkage 21 causes the movable contact to reverse. From time $t_2$ to $t_3$ the portion of waveform $E_o$ is identical with that from time $t_1$ to $t_2$. At time $t_3$ the movable contact has passed through the zero resistance portion 19 and continues downward in FIGURE 1 across linear resistance portion 18 causing output waveform $E_o$ to resemble that shown in FIGURE 2 from time $t_3$ to $t_4$. At time $t_4$ the movable contact has returned to the lowermost point of the linear resistance portion 18 of potentiometer 17 and one complete cycle of the invention has been executed; times $t_4$ to $t_5$ and $t_5$ to $t_6$ each depict successive complete cycles of output voltage $E_o$ present across output terminals 29 and 31.

Potentiometer 16 is utilized to adjust the gain of triode 11 resulting from the feedback voltage applied to grid 13 therethrough, and is coupled via resistance 23 to positive D.C. source 25 to minimize changes in bias as the gain is changed. In the invention as depicted in FIGURE 1, the utilization of positive feedback permits the use of a linear potentiometer (for potentiometer 17) having a considerably lower wattage rating than would otherwise be possible, thus reducing procurement cost and enabling the invention to safely produce a wider range of output voltage waveforms across terminals 29 and 31. Potentiometer 26, in conjunction with negative D.C. power source 28 and resistance 27, provides a means of adjusting the minimum value of the output voltage $E_o$ by allowing a small current to flow through cathode output resistance 22.

It has been found that for a particular application of an embodiment of the invention as shown in FIGURE 1, the following values and types of components have proven satisfactory:

| | | |
|---|---|---|
| Tube 11 | | ½ of a 6111 |
| D.C. source 15 | volts | +130 |
| D.C. source 25 | do | +130 |
| D.C. source 28 | do | −250 |
| Potentiometer 16 | ohms | 100,000 |
| Potentiometer 17 | do | 35,000 |
| Potentiometer 26 | do | 500,000 |
| Resistance 22 | do | 10,000 |
| Resistance 23 | do | 130,000 |
| Resistance 24 | do | 36,000 |
| Resistance 27 | do | 600,000 |

Potentiometer 16 adjusted for a gain of .8834.
Potentiometer 26 adjusted for a $V_1$ of 15 volts.

With the utilization of the above values in FIGURE 1, the output voltage excursions of $E_o$ were from a $V_1$ of 15 volts to a $V_2$ of 65 volts and provided the necessary cosecant function voltage waveform at terminals 29 and 31 for utilization in succeeding phantastron circuitry. Obviously, other values of voltage and components, such as replacing the vacuum tube by a suitable transistor, may be utilized for various specific applications as a matter of design choice.

Thus it becomes apparent from the foregoing description that the disclosed invention, a reliable hyperbolic cosecant function voltage generating circuit, is a useful and practical device having many applications, both commercial and military in the field of radar electronics. The reliability of this unit and its utilization of a linear potentiometer provide great advantage over the specially constructed cosecant potentiometers presently available.

Obviously many modifications and variations of the present invention are possible in the light of the above teachings. It is therefore to be understood that within the scope of the appended claims, the invention may be practiced otherwise than as specifically described.

We claim:
1. A function generating circuit for producing a voltage waveform of predetermined shape comprising:
   a source of positive direct current potential;
   an electron emission device having emission, control, and collection electrodes, said collection electrode being coupled to said source of positive direct current potential;
   a first potentiometer means having a movable contact and a fixed terminal, said fixed terminal being coupled to said emission electrode;
   a mechanical linkage attached to said movable contact of said first potentiometer means for coupling to a repetitive mechanical motion generating means to provide motion to said movable contact to vary its position in proportion to the desired said waveform of predetermined shape;
   a first resistance means having one terminal coupled to said movable contact of said first potentiometer means and the other terminal coupled to ground potential;
   a second potentiometer means having first and second fixed terminal means and a movable contact, said movable contact thereof being coupled to said control electrode of said electron emission device, said first fixed terminal means being coupled to said movable contact of said first potentiometer means and said second fixed terminal means being coupled to said source of positive direct current potential, said second potentiometer means providing adjustment of the amount of gain of said electron emission device; and
   output terminal means coupled across said first resistance means for providing thereat the desired voltage waveform of predetermined shape.

2. A function generating circuit for producing a voltage waveform of predetermined shape as set forth in claim 1, wherein said electron emission device is a triode vacuum tube.

3. A hyperbolic function generator comprising:
   a source of positive direct current potential;
   an electron emission device having emission, control, and collection electrodes, said collection electrode being coupled to said source of positive direct current potential;
   a first potentiometer means having a movable contact and a fixed terminal, said fixed terminal being coupled to said emission electrode;
   a mechanical linkage attached to said movable contact of said first potentiometer means for coupling to a repetitive motion generating means to provide motion to said movable contact proportional to the desired wave shape to be generated;
   a first resistance means having one terminal coupled to said movable contact of said first potentiometer means and the other terminal coupled to ground potential;
   a second potentiometer means having first and second fixed terminal means and a movable contact, said movable contact thereof being coupled to said control electrode of said electron emission device, said first fixed terminal means being coupled to said movable contact of said first potentiometer means, and said second fixed terminal means being coupled to said source of positive direct current potential, said second potentiometer means providing adjustment of the amount of gain of said electron emission device;
   a source of negative direct current potential;
   a third potentiometer means having a fixed terminal and a movable contact, said fixed terminal thereof being coupled to said source of negative direct current potential and said movable contact thereof being coupled to said other terminal of said first resistance means, to provide means for adjusting the minimum level of the output voltage waveform of said hyperbolic function generator; and
   output terminal means coupled across said first resistance means for providing thereat an output voltage waveform of predetermined shape.

4. A hyperbolic function generator as set forth in claim 3 wherein said electron emission device is a triode vacuum tube.

5. A cosecant function hyperbolic waveform generating device comprising:
   a source of positive direct current potential;
   an electron emission device having emission, control, and collection electrodes, said collection electrode being coupled to said source of positive direct current potential;

a first potentiometer means having a movable contact and a fixed terminal, said fixed terminal being coupled to said emission electrode;

a mechanical linkage attached to said movable contact of said first potentiometer means for coupling to a radar antenna rotating assembly to provide motion to said movable contact proportional to the desired wave shape to be generated;

a first resistance means having one terminal coupled to said movable contact of said first potentiometer means and the other terminal coupled to ground potential;

a second potentiometer means having first and second fixed terminal means and a movable contact, said movable contact thereof being coupled to said control electrode of said electron emission device, said first fixed terminal means being coupled to said movable contact of said first potentiometer means, and said second fixed terminal means being coupled to said source of positive direct current potential, said second potentiometer means providing adjustment of the amount of gain of said electron emission device; and output terminal means coupled across said first resistance means for providing thereat an output voltage waveform of predetermined shape.

6. A cosecant function hyperbolic waveform generating device comprising:

a source of positive direct current potential;

an electron emission device having emission, control, and collection electrodes, said collection electrode being coupled to said source of positive direct current potential;

a first potentiometer means having a movable contact and a fixed terminal, said fixed terminal being coupled to said emission electrode;

a mechanical linkage attached to said movable contact of said first potentiometer means for coupling to a radar antenna rotating mechanism to provide motion to said movable contact proportional to the desired wave shape to be generated;

a first resistance means having one terminal coupled to said movable contact of said first potentiometer means and the other terminal coupled to ground potential;

a second potentiometer means having first and second fixed terminal means and a movable contact, said movable contact thereof being coupled to said control electrode of said electron emission device, said first fixed terminal means being coupled to said movable contact of said first potentiometer means, and said second fixed terminal means being coupled to said source of positive direct current potential, said second potentiometer means providing adjustment of the amount of gain of said electron emission device;

a third potentiometer means having a fixed terminal and a movable contact, said fixed terminal thereof being coupled to a source of negative direct current potential and said movable contact thereof being coupled to said other terminal of said first resistance means, to provide means for adjusting the minimum level of the output voltage waveform of said hyperbolic waveform generating device; and output terminal means coupled across said first resistance means for providing thereat an output voltage waveform of predetermined shape.

References Cited by the Examiner

UNITED STATES PATENTS 2,718,591   9/1955   Hedeman _____ 235—197 X

MALCOLM A. MORRISON, *Primary Examiner.*

ROBERT C. BAILEY, I. KESCHNER,

*Assistant Examiners.*